United States Patent
Shaw et al.

(10) Patent No.: US 7,937,348 B2
(45) Date of Patent: May 3, 2011

(54) USER PROFILES

(75) Inventors: Craig Shaw, Macclesfield (GB); Phil Bacchus, Chester (GB); Andrew Foster, Manchester (GB); David Setty, Crosby (GB); Peter Astheimer, Glasgow (GB)

(73) Assignee: ITI Scotland Limited, Glasgow (GB)

( * ) Notice: Subject to any disclaimer, the term of this patent is extended or adjusted under 35 U.S.C. 154(b) by 829 days.

(21) Appl. No.: 11/811,368

(22) Filed: Jun. 7, 2007

(65) Prior Publication Data

US 2008/0133437 A1 Jun. 5, 2008

(30) Foreign Application Priority Data

Nov. 30, 2006 (GB) .................................. 0623942.0

(51) Int. Cl.
*G06N 5/04* (2006.01)
(52) U.S. Cl. ................. 706/45; 706/46; 706/47; 706/48; 706/62
(58) Field of Classification Search .............. 706/45–47, 706/55, 62
See application file for complete search history.

(56) References Cited

U.S. PATENT DOCUMENTS

| | | | |
|---|---|---|---|
| 5,727,950 A | 3/1998 | Cook et al. | |
| 5,941,797 A | 8/1999 | Kashiwaguchi | |
| 6,386,883 B2 * | 5/2002 | Siefert | 434/322 |
| 6,606,480 B1 * | 8/2003 | L'Allier et al. | 434/362 |
| 6,658,398 B1 | 12/2003 | Bertrand et al. | |
| 6,709,272 B2 | 3/2004 | Siddle | |
| 6,755,740 B2 | 6/2004 | Wen et al. | |
| 6,785,824 B1 | 8/2004 | Grassle | |
| 6,807,535 B2 * | 10/2004 | Goodkovsky | 706/3 |
| 6,975,833 B2 * | 12/2005 | Theilmann et al. | 434/350 |
| 2001/0034016 A1 | 10/2001 | Ziv-el et al. | |

(Continued)

FOREIGN PATENT DOCUMENTS

EP 1 383 066 1/2004

(Continued)

OTHER PUBLICATIONS

Soriano J et al: "SemanticWeb Content Adaptation and Services Delivery on Morfeos Semantic Mobility Channel" Mobile Data Management, 2006. MDM 2006. 7th International Conference on NARA, Japan May 10-12, 2006, Piscataway, NJ, USA, IEEE, May 10, 2006, pp. 78-78, XP010917952 ISBN: 0-7695-2526-1.

(Continued)

*Primary Examiner* — Omar F Fernandez Rivas
(74) *Attorney, Agent, or Firm* — Drinker Biddle & Reath LLP (57) ABSTRACT

A system is disclosed for correlating user profiles to software applications. The system may be adapted as part of a software system that interrogates a user profile and reading a learning objective as a first input, interrogates a software application and reading a learning objective as a second input, calculates a relevance of the first input learning objective to the second input learning objective, and adapts the software application in accordance with the determined relevance and/or updating the user profile in accordance with the determined relevance. A method is disclosed that correlates user profiles to software applications by reading a first learning objective from a user profile, reading a second learning objective from a software application, determining a relevance of the first to the second learning objective, and adapting the software application in accordance with the determined relevance and/or updating the user profile in accordance with the determined relevance.

46 Claims, 6 Drawing Sheets

U.S. PATENT DOCUMENTS

| | | | |
|---|---|---|---|
| 2001/0039022 | A1 | 11/2001 | Delehanty |
| 2002/0073166 | A1 | 6/2002 | Lynch |
| 2002/0091608 | A1 | 7/2002 | Odegaard et al. |
| 2002/0138456 | A1* | 9/2002 | Levy et al. .................. 706/25 |
| 2003/0039949 | A1 | 2/2003 | Cappellucci et al. |
| 2003/0052165 | A1 | 3/2003 | Dodson |
| 2003/0055800 | A1* | 3/2003 | Geoghegan ................ 706/45 |
| 2003/0207243 | A1 | 11/2003 | Shen et al. |
| 2004/0009461 | A1* | 1/2004 | Snyder et al. ............. 434/350 |
| 2004/0219504 | A1* | 11/2004 | Hattie ...................... 434/353 |
| 2004/0259068 | A1 | 12/2004 | Philipp et al. |
| 2005/0158697 | A1 | 7/2005 | Nelson et al. |
| 2005/0203767 | A1 | 9/2005 | Rogan et al. |
| 2005/0266907 | A1 | 12/2005 | Weston et al. |
| 2006/0024654 | A1 | 2/2006 | Goodkovsky |
| 2006/0040248 | A1 | 2/2006 | Aaron |
| 2006/0078863 | A1 | 4/2006 | Coleman et al. |
| 2006/0115802 | A1 | 6/2006 | Reynolds |
| 2006/0121435 | A1 | 6/2006 | Chen et al. |
| 2006/0147890 | A1 | 7/2006 | Bradford et al. |
| 2006/0188860 | A1 | 8/2006 | Morrison |
| 2006/0263756 | A1 | 11/2006 | Berger et al. |
| 2008/0014569 | A1 | 1/2008 | Holiday et al. |
| 2008/0050715 | A1 | 2/2008 | Golczewski et al. |

FOREIGN PATENT DOCUMENTS

| | | |
|---|---|---|
| EP | 1 383 067 | 1/2004 |
| EP | 1 385 112 | 1/2004 |
| EP | 1 208 554 | 6/2005 |
| JP | 5072961 | 3/1993 |
| JP | 11212439 | 8/1999 |
| JP | 2002202776 | 7/2002 |
| JP | 2006003670 | 1/2006 |
| WO | WO 99/17232 A1 | 8/1999 |
| WO | WO 00/02178 | 1/2000 |
| WO | WO 00/13158 | 3/2000 |
| WO | WO 01/39028 A2 | 5/2001 |
| WO | WO 01/42915 | 6/2001 |
| WO | WO 01/43107 | 6/2001 |
| WO | WO 01/95291 | 12/2001 |
| WO | WO 02/03358 | 1/2002 |
| WO | WO 02/37447 | 5/2002 |
| WO | WO 02/048920 A2 | 6/2002 |
| WO | WO 02/010911 A2 | 7/2002 |
| WO | WO 02/069117 | 9/2002 |
| WO | WO 02/097654 | 12/2002 |
| WO | WO 03/044664 A1 | 5/2003 |
| WO | WO 2006/048511 A1 | 11/2006 |

OTHER PUBLICATIONS

"An Empirical Investigation of Learning from the Semantic Web", by Peter Edwards, Gunnar A Astrand Grimnes, and Alun Preece, King's College, (see http://www.csd.abdn.ac.uk/~pedwards/research/semanticProf.html), 20 pages, Aug. 2002.

"Data Personalization: a Taxonomy of User Profiles Knowledge and a Profile Management Tool", by Mokrane Bouzeghoub and Dimitre Kostadinov, Laboratoire PRiSM, Université de Versailles, (see http://wwwex.prism.uvsq.fr/rapports/2006/document_2006_90.pdf) 15 pages, 2006 (unknown month in 2006, but prior to any priority date of the present application.).

"Semantic User Profiles and their Applications in a Mobile Environment", by Andreas von Hessling, Thomas Kleemann, Alex Sinner, Institut für Informatik, (see http://www.uni-koblenz.de/~iason/publications/semup.pdf), 5 pages Sep. 2004.

* cited by examiner

USER PROFILES

FIELD OF THE INVENTION

The present invention relates to user profiles, in particular to an instruction set for a computer and associated methods and systems for the management of user profiles across different software applications and most particularly to a persistent and transferable user profile for use in a learning application which in particular can be a games based learning application.

BACKGROUND

User profiles are used with a wide variety of applications and have varying levels of descriptivity and complexity. At its most basic level the user profile is a simple form with pre-defined fields, for example string entries giving values for given fields. However, the categorization of the fields together with the use of the data contained therein varies widely from application to application.

One common use for a user profile is found in the field of on-line searching where the profile is used to filter results to yield only relevant information to a certain user as search results.

This is discussed for example in the paper "Data Personalization; a Taxonomy of User Profiles Knowledge and a Profile Management Tool" by Mokrane Bouzeghoub and Dimitre Kostadinov (of the Laboratoire PRiSM, Université de Versaillessee), which describes data personalization to facilitate the expression of the need of a particular user and to enable him to obtain relevant information when he accesses an information system. That is, the user profile contains information about the user's preferences which is then used to filter search results when he searches for goods and services.

Profiles are also used by certain on-line retailers such as Amazon, which gathers information about a user's browsing habits and purchase history in order to suggest products which the user may wish to purchase. The user profile contains a mixture of information to which marketing intelligence can be applied, such as social demographic information based on the user's age, gender etc, together with dynamic information such as purchasing history and habits which are updated as required and can help filter searches or provide recommendations for a user to purchase.

In recent times the concept of a semantic web has gained prominence, whereby information and documents on the World Wide Web are marked up with a computer processable machine readable meaning, which can then be interpreted by related processing pools. One of the key benefits of the semantic web is to enable better machine searching of webpages, as the relevance of content is understood by a machine ultimately in the same way that a human user would understand it.

Semantic technologies have been proposed for a number of applications, see for example the document "Semantic User Profiles and their Applications in a Mobile Environment" by Andreas von Hessling, Thomas Kleemann and Alex Sinner of the Koblenz University in Germany (published by IASON-Project at University of Koblenz-Landau, Institut für Informatik, Arbeitsgruppe Künstliche Intelligenz, Universitätsstr. 1 56070 Koblenz which proposes a peer-to-peer based mobile environment consisting of stations providing semantic services and users with mobile devices which manage their owner's semantic profile. The key motivation here is to enable users of mobile devices to easily find goods and services which are both close to their location and which are of interest to them in accordance with their profile.

Another semantic profile is disclosed in the document "An Empirical Investigation of Learning from the Semantic Web" by Peter Edwards, Gunnar Aastrand Grimnes and Akin Preece of Aberdeen University, Proceedings of ECMUP-KDD-2002 Semantic Web Mining Workshop, which explores the impact of the semantic web on machine learning algorithms used for user profiling and personalization, again with the motivation for enabling searching to be performed accurately and providing relevant results.

In the fields of computer games and of learning applications, users also have user profiles. Typically these are simple profiles comprising for example the user's name and virtual character appearance, together with information on the score that a character has accumulated during the game or past performance in a particular learning application. At present, a player's achievements in a learning application can only be stored and only have a meaning within that particular learning application. Also in the games environment a player's achievements in one game are not transferable to upgrade their status or enhance their progress in other games, except for a limited number of circumstances where the games are part of the same series written by the same company.

Approaches for reusable software components persistent between contexts are described in WO 02/10911, WO 99/17232, WO 02/48920 and WO 03/044664, which are of interest for general background information. However, there is currently no way for a user profile to be ported between different games or learning applications so that user profiles including learning objectives can be seamlessly used across a range of learning applications.

SUMMARY OF THE INVENTION

According to a first aspect of the present invention there is provided an instruction set for a computer comprising:
  a system for interrogating a user profile and reading a learning objective as a first input;
  a system for interrogating a software application and reading a learning objective as a second input;
  calculation component for determining a relevance of the first input learning objective to the second input learning objective; and
  a system for adapting the software application in accordance with the determined relevance and/or updating the user profile in accordance with the determined relevance.

In one embodiment, the system for adapting the software application includes instructions for applying a weighting factor to at least one of existing experience data in the user profile related to the learning objective of the software application and performance data related to the subsequent use of the software application.

The calculation component may comprise a semantic profiling component adapted to determine a quantitative similarity of meaning between the first input learning objective and the second input learning objective for use as the relevance.

The semantic profiling component may comprise a predefined relevance look up table (LUT) for the comparison of one learning objective with the other to obtain the quantitative similarity.

In one embodiment the semantic profiling component comprises a thesaurus comprising clusters of similar terms.

Preferably, the thesaurus is further provided with an indication of the degree of similarity of each cluster or individual term.

The semantic profiling component may include a search engine for querying a predefined resource or an on-line search engine and then learning the closeness of the two input terms from the results.

In one embodiment, the learning objectives can be viewed by a facilitator and modified manually.

The instruction set may include profile update component for receiving user performance data and an updated learning objective from a software application in the form of an updated learning objective, and then translating said performance data and said updated learning objective back into a user profile.

The translation step may use a weighting factor which is the inverse of the weighting factor used for adapting the software application.

In one preferred embodiment, the user profile is a team profile. The user profile may be part of a composite team profile.

The weighting factor may take into account a level-of-activity factor calculated on the basis of at least one of: the number of attempts that have been made to perform certain actions in a given software application, the elapsed time and the degree of success or failure.

The instruction set may further include a data gathering component to gather statistical data. The statistical data may comprise at least one of: high scores, low scores, average scores, median scores, standard deviation of scores, most popular combination of first and second learning objective, least popular combination of first and second learning objective Preferably, the statistical data is computed for groups of users with similar attributes. In one embodiment, the groups of users with similar attributes correspond to high or low achieving groups.

The software application may include one or more measured objectives formed from a related group of software application measurements; and may be adapted for the assessment of a learning objective, said learning objective is preferably formed from:
  the selection of one or more measured objectives;
  defined outcome conditions for the measured objectives; and
  selected outcome activities that each invoke a command in the learning application.

The instruction set may be executed on a server computer that controls the operation of the software application. Alternatively, the instruction set may be executed on a client or user computer. Preferably, the instruction set is stored as part of the user profile.

The software application is preferably at least one of: a game, a learning application, a games based learning application or a training simulation.

According to a second aspect of the invention there is provided a method of correlating user profiles to software applications comprising the steps of:
  reading a first learning objective from a user profile;
  reading a second learning objective from a software application;
  determining a relevance of the first learning objective to the second learning objective; and
  adapting the software application in accordance with the determined relevance and/or updating the user profile in accordance with the determined relevance.

The step of adapting the software application may comprise applying a weighting factor to at least one of existing experience data in the user profile related to the learning objective of the software application and performance data related to the subsequent use of the software application.

The step of determining a relevance of the first learning objective to the second learning objective may comprise determining a quantitative similarity of meaning therebetween.

The step of determining a quantitative similarity of meaning between the first and second learning objectives may include performing a look-up operation to interrogate a predefined relevance look up table (LUT).

The step of determining a quantitative similarity of meaning between the first and second learning objectives may include interrogating a thesaurus comprising clusters of similar terms. Preferably, the thesaurus is further provided with an indication of the degree of similarity of each cluster or individual term.

The step of determining a quantitative similarity of meaning between the first and second learning objectives may include interrogating a search engine to query a predefined resource or an on-line search engine and then learning the closeness of the two input terms from the results.

In one embodiment, the learning objectives may be viewed by a facilitator and modified manually.

Optionally, the method further comprises the step of receiving user performance data and an updated learning objective from a software application, and then translating said performance data and said updated learning objective back into a user profile.

The step of translating said performance data back into a user profile may include the use of a weighting factor which is the inverse of the weighting factor used for adapting the software application.

In one preferred embodiment, the user profile is a team profile. The user profile may optionally be part of a composite team profile.

The weighting factor may take into account a level-of-activity factor calculated on the basis of at least one of: the number of attempts that have been made to perform certain actions in a given software application, the elapsed time and the degree of success or failure.

The method may further include the step of gathering statistical data. Preferably, the statistical data includes at least one of: high scores, low scores, average scores, median scores, standard deviation of scores, most popular combination of first and second learning objective, least popular combination of first and second learning objective.

The statistical data may be computed for groups of users with similar attributes. The groups of users with similar attributes may correspond to high or low achieving groups.

The software application may include one or more measured objectives formed from a related group of software application measurements; and may be adapted for the assessment of a learning objective, said learning objective preferably being formed from:
  the selection of one or more measured objectives;
  defined outcome conditions for the measured objectives; and
  selected outcome activities that each invoke a command in the learning application.

The method may be executed by a server computer that controls the operation of the software application. Alternately or in addition, the method may be executed by a client or user computer. Preferably, the method is executed by the user profile.

The software application may be at least one of: a game, a learning application, games based learning application, or training simulation.

According to a third aspect of the invention there is provided a software system comprising a software application for the assessment of a learning objective and an instruction set according to the first aspect.

BRIEF DESCRIPTION OF THE DRAWINGS

The present invention will now be described, by way of example only, with reference to the accompanying drawings in which.

DETAILED DESCRIPTION OF THE PREFERRED EMBODIMENTS

The present invention provides for a user profile that can be used between different learning applications, so long as the learning applications have the relevant characterising features as discussed below. The learning applications can be games-based-learning applications. The learning applications do not need to be designed by the same people, be related or even be of the same gaming genre. The only qualification is that they can receive and interpret profiles in the manner to be discussed herein.

This can be achieved when a predetermined development platform is used to design the learning applications. As an example, a suitable development platform is a games-based learning (GBL) platform as described in co-pending application GB 0616107.9 filed on 15 Aug. 2006 and corresponding U.S. application Ser. No. 11,810,299, filed on 4 Jun. 2007, which are incorporated herein by reference in their entirety.

Figure 1:
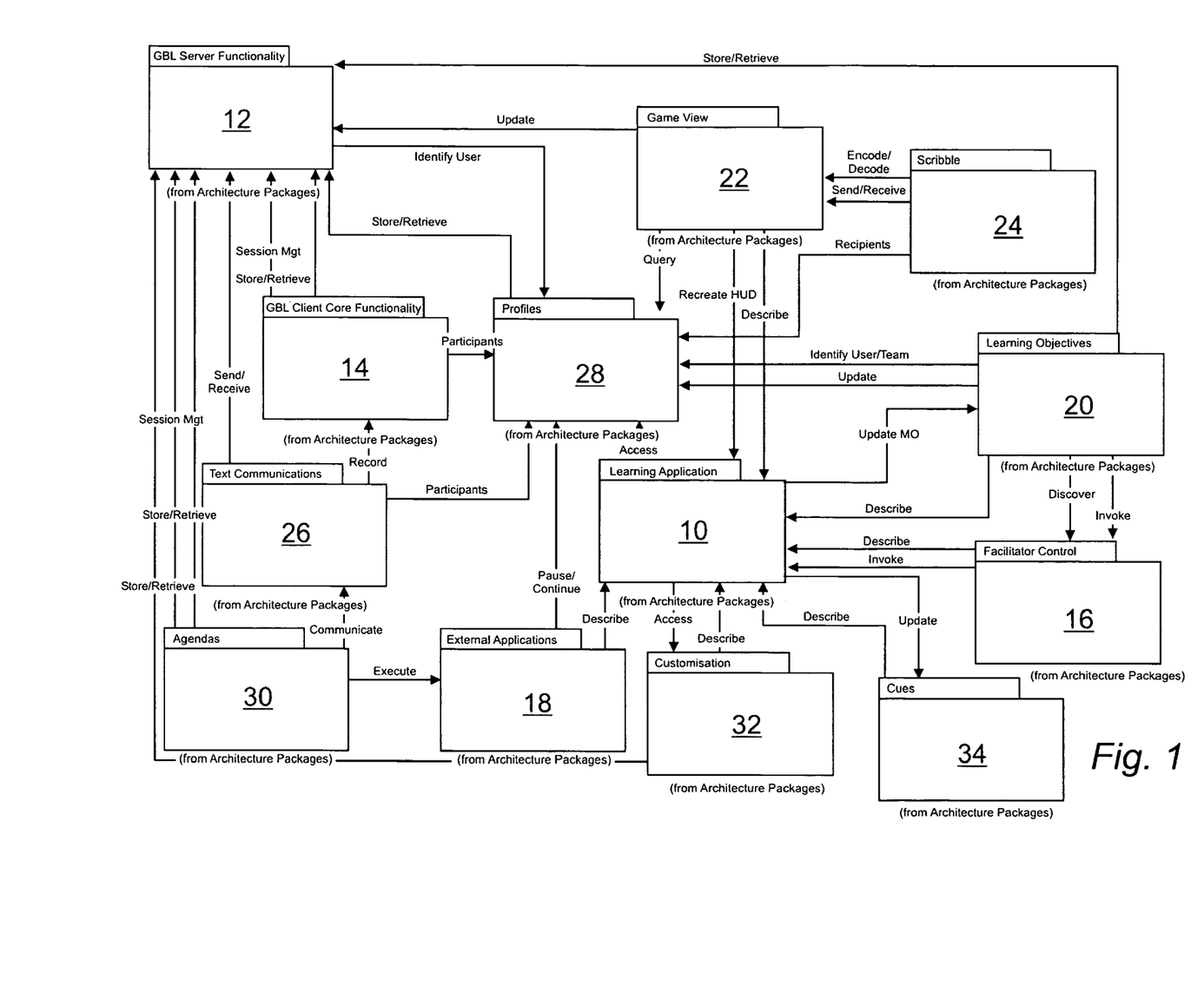
FIG. 1 illustrates an overall architecture of a system environment that is suitable for the implementation of user profiles.

FIG. 1 shows a general system architecture for a GBL platform. A learning application 10 is a distributable virtual environment that provides immersive educational content and is executed on the GBL platform. It is to be understood that the system of FIG. 1 is only one possible example of a system for the implementation of the invention. Other systems apart from those shown in FIG. 1 can be used, and within the system of FIG. 1, it is to be understood that not all of the illustrated components are essential. The true scope of the invention is to be understood with reference to the accompanying claims.

The GBL server functionality 12 exists alongside an existing game engine server and extends the functionality offered by an existing game engine to enable learning applications to handle multiple players.

The GBL client core functionality 14 comprises components that exist within all users' clients that are participating within a given learning application event (LAE) and encompasses functionality that is either fundamental to the operation of a user's client or common across all the user clients.

The facilitator control component 16 allows a facilitator to initiate designer specified commands within a learning application, and allows a facilitator to present information or tutorials to any player participating within the learning application, and provides solutions to support learning objective outcomes.

The external applications component 18 allows a learning application to execute an external application, other than the learning application itself, on the players' consoles, and allows a facilitator to launch an external application for the purpose of assessing a player participating within the learning application.

The learning objectives component 20 allows a players' performance within a learning application to be monitored and assessed by a learning manager, facilitator or the learning application. A learning manager can create and modify learning objectives within a GBL application to better fit with the needs of a particular organisation or individual. These learning objectives can then be assigned to players or teams to monitor and assess performance.

The game view component 22 allows the facilitator to view the learning application from the perspective of a player, a learning application (LA) designer defined camera or from a free-camera and allows a facilitator to provide assistance to players by drawing a freehand image which will be superimposed over their learning application's user interface in real-time.

The scribble component 24 interacts with the game view component 22 to allow a facilitator to provide assistance to players by drawing a freehand image which will be superimposed over their learning application's user interface in real-time.

The text communications component 26 allows user-to-user text communications during learning application events (the functionality offered by the chat window feature will only be available to its users if the learning application designer makes an area of the learning application's user interface available to be used for text communications). It also allows a facilitator or team leader to hold a meeting between all the members of a team defined within a learning application event, and a debrief feature that encourages an individual or team to reflect on progress within the learning application event by providing the ability for a learning application to present reflection agenda items to the player in a consistent and structured manner at game selected points. The debrief feature also provides the ability for the facilitator to be able to assess an individual's performance by observing how they respond to the reflection agenda item.

The profiles component 28 allows for the creation and modification of player profiles for players who are users of the GBL platform and are able to participate within learning application events, which can be used to monitor and assess a player's performance within these events, and provides a team management feature which allows the facilitator to define groups of cooperating players within a learning application event and create a team profile that can used to monitor that team's performance within the event.

The agendas component 30 allows a facilitator or team leader to hold a meeting between all the members of a team defined within a learning application event, and a debrief feature that encourages an individual or team to reflect on progress within the learning application event by providing the ability for a learning application to present reflection agenda items to the player in a consistent and structured manner at selected points in the game. The debrief feature also provides the ability for the facilitator to be able to assess an individual's performance by observing how they respond to the reflection agenda item.

The customisation component 32 provides the ability for a learning manager, facilitator or SME (small-to-medium size enterprise) to customise a learning application based, upon any configurable items specified by the learning application designer in order to achieve a higher level of authenticity and appropriateness for a particular organisation and tailor a particular learning event for a particular individual, set of individuals or teams.

The cues component 34 allows the learning application designer to provide help or status relating to the game elements of the learning application in a non-intrusive (to learning application flow) manner. The information to be presented will be located within the proximity of the object within the learning application.

Figure 2:
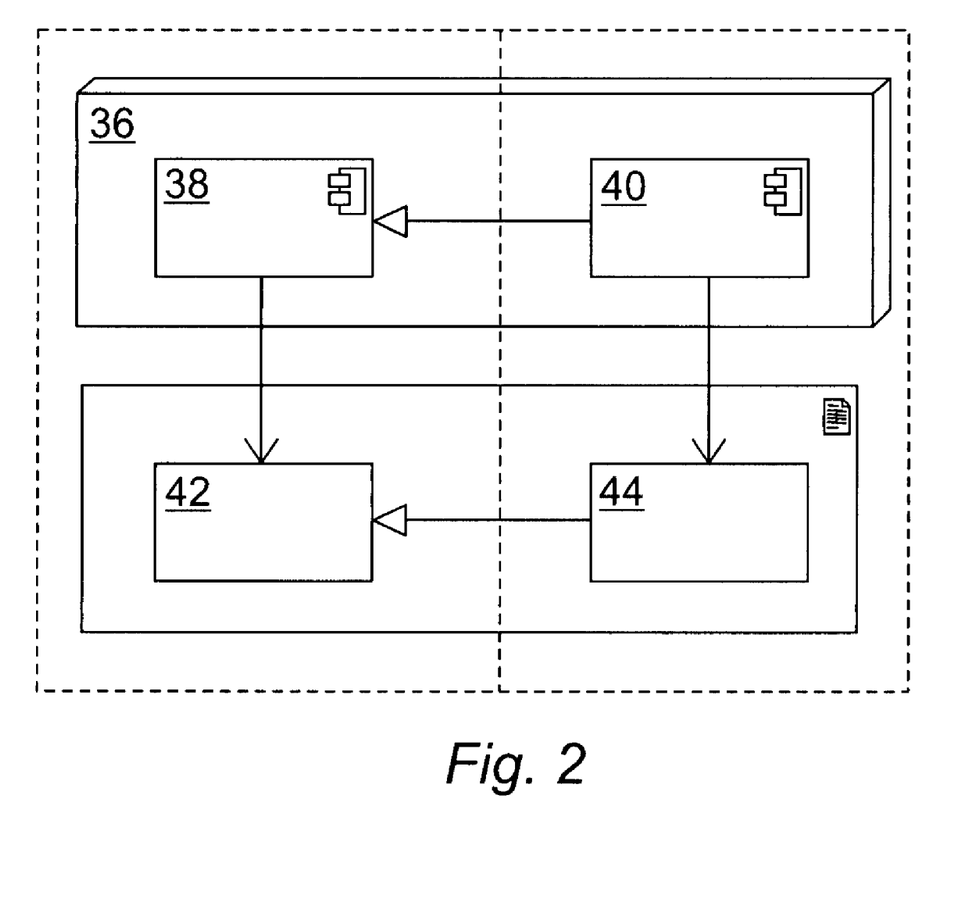
FIG. 2 illustrates a developer deployment environment for the system of FIG. 1.
Figure 3:
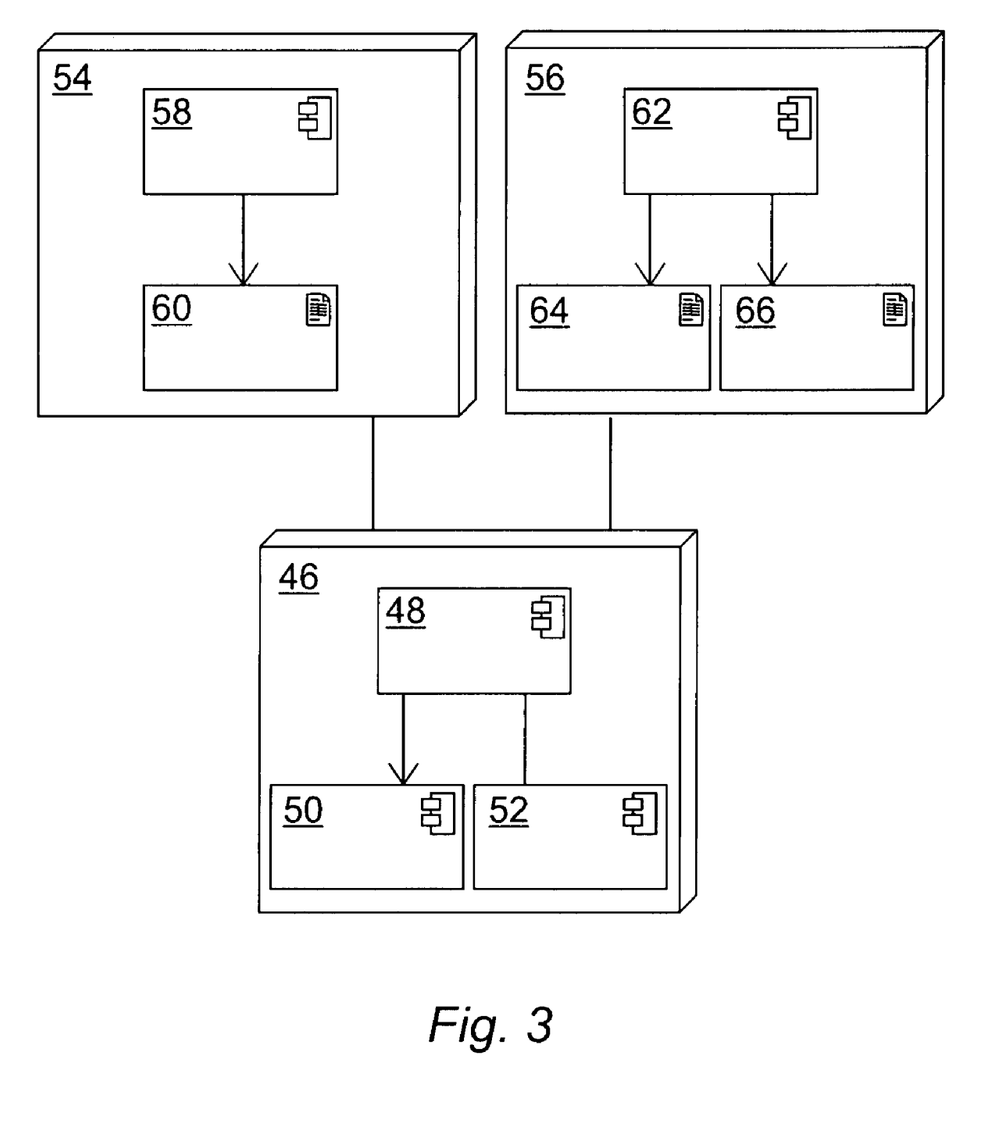
FIG. 3 illustrates a runtime deployment environment for the system of FIG. 1.

The component deployment is flexible as the components are modular in nature. However, an example deployment is shown in FIGS. 2 and 3. In a general sense, the GBL platform supports a developer deployment environment for the production of learning applications, shown in FIG. 2 and a runtime deployment environment for the execution and monitoring of a learning application, shown in FIG. 3.

As seen in FIG. 2, in a developer environment a development computer 36 runs an existing game engine software development kit (SDK) 38 along with the GBL SDK 40, which provides an extension of the existing game engine SDK 38 relating to a set of learning extensions supported by the GBL SDK 40. The existing game engine 38 creates a game engine application 42 which can be extended by a GBL application 44 which is created by the GBL SDK 40.

FIG. 3 illustrates an exemplary runtime environment. A server computer 46 runs the game engine's server 48 which communicates with a server standalone player module 50 that manages the multi-player aspects of a learning application. A connection is maintained with an ODBC compliant GBL database 52. The server computer 46 is linked (for example through IP communications links) to a player computer 54 and a facilitator computer 56. The player computer 54 is provided with a player standalone player 58 that executes a learning application 60. The facilitator computer 56 is provided with a facilitator standalone player 62 that executes a facilitator learning application 64 and facilitator application 66.

In an alternative runtime environment, the learning application can be provided as a standalone program to be executed on the player's computer, so that no communications link to an outside server is required. In that scenario, the standalone player 60 comprises a "games based learning" program to be run on the player computer which provides games based learning functionality to the user's computer, including the storage of user profiles that are updated as the player uses different applications. The player can then choose different applications which he can purchase or download that are then played using the standalone player 60, and so his past performances in other applications can be stored on his computer for interaction with other applications as described below.

It is useful at this point to review the definitions and capabilities of the various people that interact with the GBL platform. A designer is a software developer that uses the developer environment shown in FIG. 2 to create a computer game which can take any form that he chooses. For example, it could be a jungle survival game or a World War 2 based first person role-playing game (RPG). No matter the type and theme of the game, it can be used for the measurement and assessment of any learning objective, as described below. The term "game" will generally be synonymous with the term "learning application" unless specifically stated otherwise.

A facilitator assists players to learn. He is responsible for establishing and overseeing a learning application event, and for performing event configuration, run-time customisation, communication and analysis for assessment. He can also define learning objectives, as discussed below, and is involved in agendas and team meetings, as discussed elsewhere. He generally might not have any technical expertise but does possess expertise in facilitation and analysis for assessment purposes. In one form of the platform, a player can also have full facilitator control so that he can set his own learning objectives, that is, the facilitator and the player can be the same person in an embodiment where the learning application is used for self-assessment.

A learning manager is a facilitator that has more permissions within the GBL platform, specifically for managing the game's configurable information and for defining learning objectives. The relative permissions granted to the learning manager and the facilitator can be modified, and as such the learning manager aspect is an optional extra of the GBL platform. It may be used for example for a large company, where the learning manager has the overall responsibility for learning, so they define the learning objectives that are to be assessed, leaving it to the facilitators to oversee the actual learning application events and to carry out the assessments. Or, for a smaller company, the distinction between learning manager and facilitator can be dispensed with and the facilitator can have full control permissions for setting configurable information (within the limits previously specified by the game designer), defining learning objectives and monitoring and recording the players' performance during a learning application event.

Finally, the players are the users who use learning application to be taught various skills or topics. The players can be organised into teams and a particular player can be designated as a team leader for the purposes of organising team debriefings and agenda discussions.

Now, selected aspects of the above components will be described in more detail.

Figure 4:
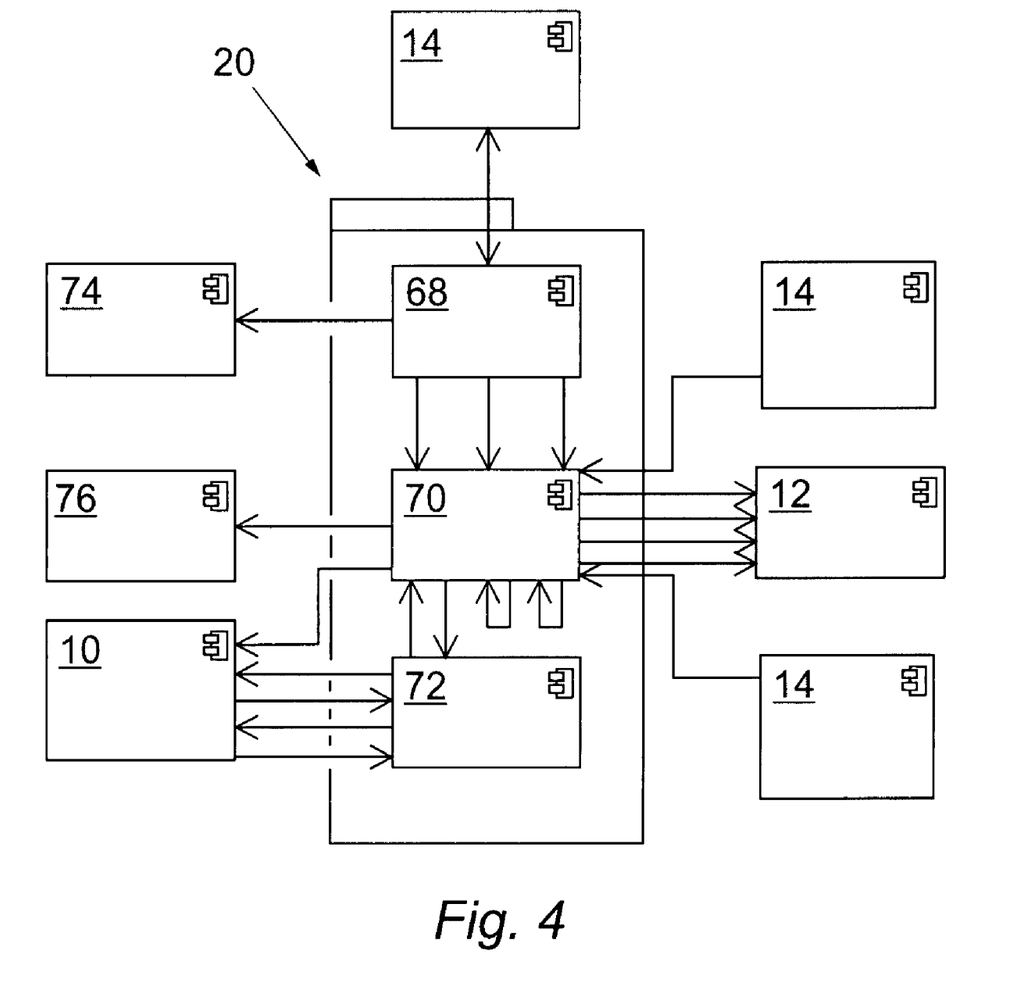
FIG. 4 illustrates a learning objectives component as used in the system of FIG. 1.

Firstly, the learning objectives component 20 will now be described with reference to FIG. 4. Learning objectives can be managed to allow a player's performance within a learning application to be monitored and assessed by a learning manager, facilitator or the learning application.

The learning objectives component 20 is a key part of a method of in-game assessment, providing a suite of design tools and assessment tools that allow a learning manager to define their own assessments according to their needs and the needs of the participants for any given game, rather than in previous games for learning in which the learning objectives are restricted by the game itself.

A learning objective controller 70 is provided that manages all learning objectives that are defined for a learning application event and handles requests from other GBL components that relate to them. These activities may include:

Installing designer defined learning objectives into the GBL platform via an installation coordinator interface of the GBL client core functionality component 14.

Assigning learning objectives to either players or teams by updating a profile controller 76 of the profile component 28.

Evaluating completion conditions for any assigned learning objective (with reference to the measured objective controller 72 which communicates with the learning application 10.

Evaluating learning objective outcome activities for completed learning objectives.

Instructing appropriate learning objective outcome activities to be invoked for a player.

Store and retrieving learning objectives and learning objectives assignments via the GBL server functionality 12, using its "storage manager" component.

Provide a list of learning objectives and their details on request.

Updating the appropriate profile/s via "profile controller" component when a learning application session ends.

Saving and restore the learning objective controller state on request.

The learning objective interface 68 also provides a Learning Objective Assignment programming interface for assigning or un-assigning a player or team with a learning objective that has been defined by the learning application designer.

The measured objective controller 72 referred to above manages all measured objectives that are defined within a learning application and handles requests from other GBL components relating to them. Its interactions with the learning objective controller 70, the runtime controller of the learning application 10 and a learning application event controller of the GBL client core functionality 14 are shown in FIG. 4. The measured objective controller 72 may be responsible for:

Understanding the measured objectives that are defined within the learning application.

Receiving updated measurement values from the learning application for all measured objectives.

Maintaining a list of current measurements for all measured objectives.

Collating multiple measurement values and calculating a single measurement value for measured objectives involved with team based learning objectives.

Receiving notifications to start or stop measured objectives from the learning application.

Maintaining a list of current measurement status (started or stopped) for all measured objectives.

Providing the current measurement values for all measured objectives.

Providing the current measurement status for all measured objectives.

Providing a timer for timed measurements.

During the design of a game, the designer specifies a number of learning application (LA) measurements, which are combined to form a measured objective (MO). The LA measurements can comprise any variable or parameter within the game as defined by the designer, which can include an incrementable counter, a value, a floating point, a string, a Boolean operator or a timer.

In general, a game may comprise a number of objects, attributes, internal relationships and an environment, with interactions being governed by a set of rules. For example, a game typically comprises an environment defining boundaries for game activities, one or more user-controlled agents, computer controlled agents and computer controlled environmental parameters. The LA measurements can comprise any variable within this and any other scheme, including any of the environmental parameters and any characteristic which is allocated to the user-controlled agent, or to the computer controlled character.

As a further specific example, a game environment could comprise a jungle area which comprises a river portion and the user controlled agent could comprise a human explorer, so that the river portion defines a portion of the environment that the explorer cannot walk on. An environmental parameter could comprise a population density of piranha fish in the river, and the computer controlled character could comprise one or more tigers. The LA measurements could then comprise the strength and speed of the explorer, the strength and speed of the tigers, the population density of the piranha fish, the speed of water flow in the river, and so on.

Each LA measurement is defined by a name, a unique identifier, a description and a measurement type, as mentioned above. It is typical that three types are available—counter, value and duration.

The game designer then specifies a number of measured objectives, giving each of them a name, a unique identifier, a description, and a list of LA measurements used to form the measured objective. Each measured objective has a clearly defined start and end point. For example, the measured objective could be the time taken to complete various tasks, or the count of a particular parameter once a task has been completed.

The game designer also specifies a number of outcome activities which are to be supported by the learning application. The outcome activities are references to executable logic within the learning application script. An outcome activity will be invoked when an outcome condition is satisfied. This can be done automatically during the performance of a learning application event. Each outcome activity definition includes a unique name and a value (expressed in terms of the LA measurements) for the outcome activity, and a description of the logical behaviour to be performed by the outcome activity.

The learning manager can then create a learning objective (LO) by selecting one or more measured objectives and one or more outcome activities which are made available by the designer, and by defining outcome conditions which specify objective thresholds to be applied to the associated outcome activities.

The learning manager then requests and obtains a list of all LA commands defined within the LA script, and associates an outcome activity to each outcome condition defined. The outcome activities can for example be one of the following: A learning application command; Write to a players profile; Create a reflection or debrief agenda item.

The learning manager interacts with the GBL client core functionality 14 via its facilitator client interface through which a learning objective interface 68 presents a learning objective management interface for the creation and management of learning objectives. The learning objective controller 70 obtains the measured objectives and LA measurements from the measured objective controller 72 which reads the measured objectives from the learning application 10 via its runtime controller.

The learning objective is defined as a combination of the measured objectives and chosen outcome activities, the invocation of which is described by one or more outcome conditions that specify, via a mathematical formula defined by the learning manager, a predetermined criteria expressed in terms of measured objectives which determines when the outcome activities should be invoked.

The facilitator or learning manager makes a qualitative decision as to the definition of a learning objective based on particular thresholds and combinations of one or more measured objectives. For example, in the above jungle game, a player may be part of a team (of computer generated or other player controlled characters), and a facilitator may want to assess as a learning objective how effective a player's team leadership skills. The facilitator therefore can construct a learning objective to measure team leadership by selecting the measured objectives of the number of survivors crossing a river, the final strength of players that survive, and the time taken to complete a river crossing are evaluated, and then, for example, the team leadership could be assessed as a weighted combination of the measured objectives, with a particular objective deemed to be more important than another objective being given a higher weight in the calculation. The learning objective can be defined either before a learning application event begins or during the performance of a learning application event.

In a further exemplary process, a players' LA actions are measured against a learning objective. When the player performs a LA action, the LA script determines and performs an appropriate response. The possible responses being for example: Do nothing; Start or stop a timer; Increment or decrement a counter; Store a value; or Complete a measured objective.

When measured objectives are started, measurements are made by the platform only if a learning objective contains the measured objective and that learning objective is assigned to a player. Assignment of a learning objective to a player indicates that the platform should no longer ignore measurements for a started measured objective.

The platform then determines whether any learning objectives have ended. For all completed learning objectives, the platform evaluates the outcome conditions to determine which outcome activity to perform, instructing the LA script as appropriate. For all outcome conditions met, the platform can record the outcome condition in either the player or team profile, as appropriate.

That is, in the above example, after the river crossing is complete, the learning objective is assessed and the appropriate outcome conditions are evaluated. Depending on the outcome conditions, a different outcome is selected which results in a particular command being carried out. For example, based on the combination of the measured objectives, the facilitator can calculate an overall score for a player's team leadership skills. If this score is over a predetermined threshold, the player can be passed to the next level of the game, or to have the difficulty increased by varying the game's configurable information (for example, increasing an LA measurement such as the number of piranhas in the river), or if below, he can be asked to repeat the task.

It will be appreciated that the same jungle game could then be used to assess different learning objectives, for example, jungle survival skills, aggressiveness, decision making, and so on. The interfaces and components of the learning objectives component 20 and the GBL platform in general provide the tools and the environment for one or more facilitators to define a predetermined assessment method of any chosen learning objective within the context of any one game (learning application).

The outcome conditions are preferably evaluated by the platform in the order specified when a measurement is made and when a measured objective has been stopped. Consequently, learning objectives that are specified by a learning manager are started and stopped implicitly when the measured objectives used are started and stopped. The actions, timings and cues for the starting and stopping of measured objectives are typically specified by the LA designer within the LA script, which determines whether a learning objective is assessed at the behest of the facilitator, or automatically, or a selectable combination of both. It may be possible for a measured objective to be attempted more than once, in which case the platform will store the previous values of the measured objective measurements and reset to initial values.

Once defined, all learning objectives can be assigned or unassigned to either players or teams throughout a learning application event. Whenever a learning objective is assigned or unassigned to a player, a historical record of the assignment and ultimately the learning objective results within that LA event can be stored within the player's profile. When a learning objective is assigned to a team, this player's historical record can be stored to form part of the team's profile, so that measurements made by the learning application take account of the team profile and its composite learning objectives.

It is of course possible that during a learning application event the measurement of one measured objective may contribute to more than one learning objective and that a single learning application event can give data for the assessment of more than one learning objective. The outcome activities are performed on the basis of a command actioned by the achievement of the threshold of the measured objective. When a measured objective has been stopped the outcome conditions are evaluated in specified order.

It is to be appreciated that the learning objectives can be assessed as part of a single player or a multi-player game, without restriction. The objectives can be assigned to one particular player or to a team in general, for a fully flexible assessment environment.

Another exciting feature provided by this solution is the run-time interaction of the assessment. The assessment can be carried out while a learning application event is running and the facilitator can determine the feedback appropriate to the achievement and the situation, and then issue a game command that will change the game as needed, either by an automatically invoked command set out in the LA script or by direct intervention.

Figure 5:
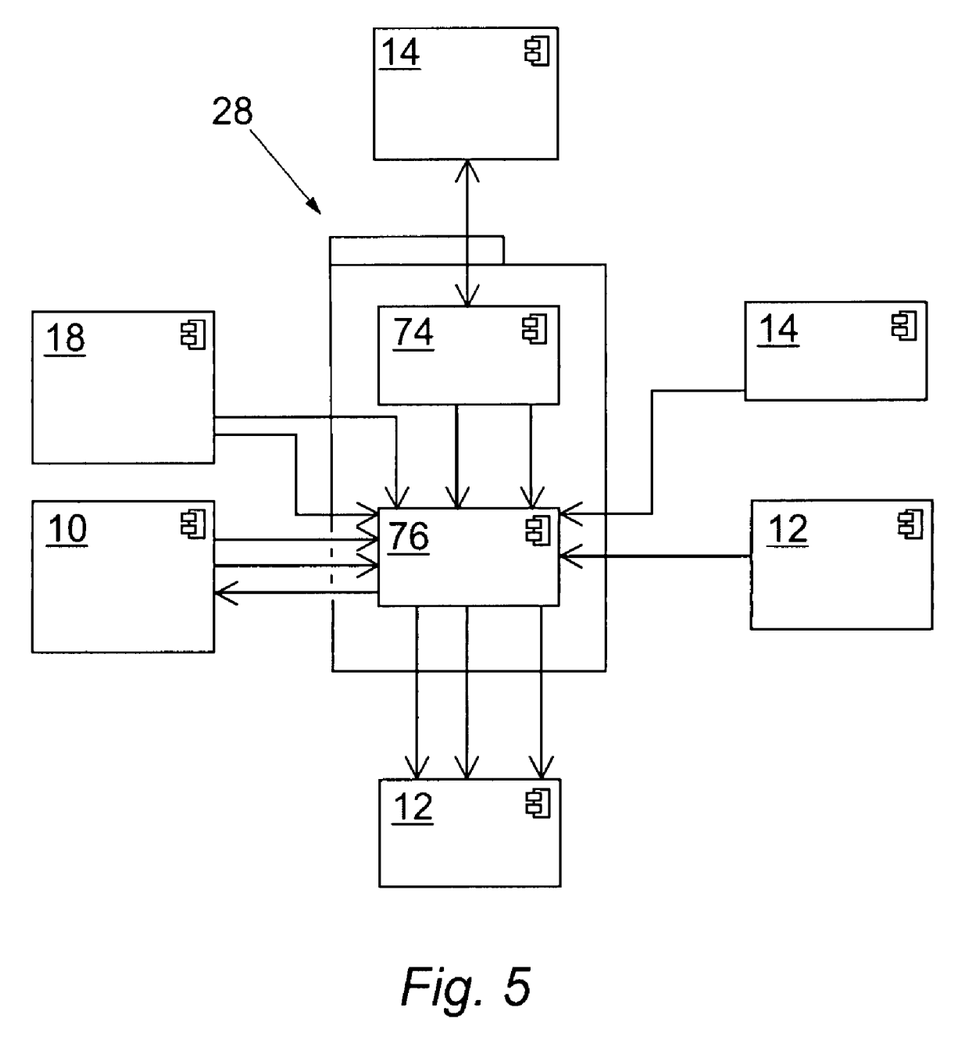
FIG. 5 illustrates a profiles component as used in the system of FIG. 1.

The profile component 28 will now be described with reference to FIG. 5.

A separate player profile will be used for each player capable of participating in a learning application event. The player profile will also archive the pertinent facts about the players learning activities and achievements over an extended period of time, such as an academic term for example.

The player profile information, in conjunction with the team profiles, will be used by a facilitator to analyse and adapt the learning needs of a player; therefore, the facilitator will normally need full access to the information it contains.

Equally, the learning application script logic and the learning objective outcome activities need to be able to record facts relating to players learning progress. Therefore, they also need full access to the information it contains.

It is not necessary for a player themselves to be able to access the player profile information.

A separate team profile will be used to identify each team of players existing within a single learning application event. The team profile will also archive the pertinent facts about the teams learning activities and achievements within a single learning application event.

The team profile information, in conjunction with the player profile, will be used by a facilitator to analyse and adapt the learning needs of a player in that team; therefore, the facilitator will need full access to the information it contains. Again, it is not necessary for a player themselves to be able to access the team profile information.

The component 28 comprises a profile interface 74 that allows the profiles associated with players and teams within a learning application event to be viewed and modified, and a profile controller 76 that manages all aspects relating to the players and teams that are defined within GBL platform.

The profile interface 74 comprises a player profile management interface that enables a facilitator to add, view, change or delete all persistent information relating to any players' profile; a team profile management interface that presents the facilitator with the ability to view, create, edit and delete teams and manage the assignment of team members by adding and removing players; and a team leader selection interface that presents the facilitator with the ability to appoint or release a team leader to/from a team.

The profile controller 76 comprises a Player Query Interface that gets a list of players present within the current learning application event; a Team Query Interface that gets a list of teams present within the current learning application event, gets a list of players in each team, and queries which player is assigned as the team leader for a team within a learning application event; a Player Profile Access Interface that can retrieve and modify any information relating to a players' identity, retrieve and add to information relating to players' learning application event activities, and modify any information relating to players' learning application event activities; a Player Profile Creation Interface that creates a player profile identity with player identity attributes for an identified player; a Team Profile Access Interface that will enable a learning application script and a learning objective outcome activity to read or change all persistent information relating to the teams' profile; a Team profile creation interface that enables a learning application script to create a team profile; a Suspend Player Interface that suspends the extraneous processing of a player's learning application such as the rendering, temporarily removes the player from the learning application session, and requests suspension of any learning objectives assigned to the player; and a Resume Player Interface that resumes the player's presence within the learning application session using the previously saved player suspension information, restores the extraneous processing of a player's learning application such as the rendering, and resumes any suspended learning objectives.

The user profile of the present invention can comprise the user's personal data and their training record comprising all relevant data required to define the training record, achievements, progress and objectives of an individual, including the learning objectives which the user has performed, the learning objectives which have yet to be achieved (for example target learning objectives set by a facilitator), their learning objective achievements and a history of learning applications which they have used. This training record can be used to define training needs and to formulate and agree actions to meet these training needs.

Figure 6:
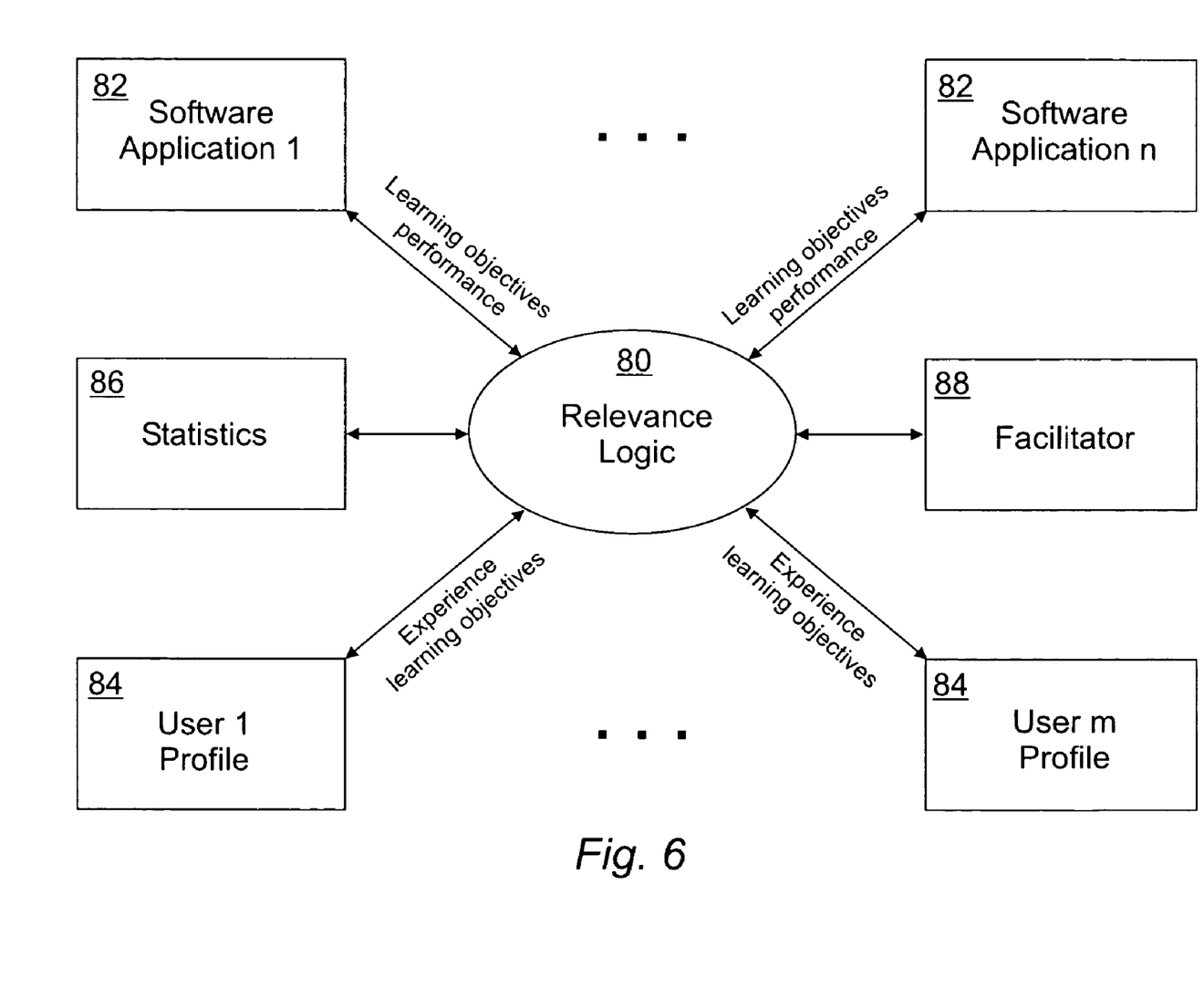
FIG. 6 illustrates a method of correlating user profiles between software applications.

FIG. 6 shows how different user profiles can be used with different software applications. A relevance logic 80 is provided as an interface between software applications 82 and user profiles 84. As mentioned above, the architecture of any given system for the provision of learning applications is flexible, but in one example, the relevance logic 80 can be provided as a function that runs on the server computer 46 as shown in the run time environment of FIG. 3. Alternatively, it can be provided as part of the learning application 60 as run on the player computer 54 as shown in FIG. 3, or as part of the profile itself.

The relevance logic 80 interrogates a user profile 84 and receives learning objectives from it, and then, when a user chooses to use a selected software application 82, the logic 80 interrogates the software application 82 to receive the learning objectives that are offered by the application. The relevance logic 80 then compares the profile's learning objectives and past achievements that are in the profile 84 with the learning objectives that are offered by the learning application 82. This comparison is done on the basis of a semantic comparison, or profiling, between the learning objectives in the profile and the learning objectives offered by the selected application.

There are several ways in which the semantic profiling can be performed. As one option, the relevance logic 80 comprises a database that has a look-up table of comparisons between objectives, giving a figure representing the relevance of one term to another. These terms can include a list of all envisaged learning objectives, with the relevance being input manually by a software designer or a facilitator. A facilitator 88 of any particular software application can define new learning objectives, in the manner described above, and can give them any name of his choosing. If the name of a new learning objective is not contained in the list of terms that already exists, the relevance logic 80 can use a thesaurus to obtain an indication of the equivalence of terms to one another. The thesaurus can contain clusters of terms, with an indication of the degree of similarity of each cluster or individual term. Alternatively, a more sophisticated automatic search can be performed, whereby a search can be performed, either through a predefined source text or through an intranet or world wide web, and the relevance of any given two terms can be assessed based on the results of the search, for example using a filter to determine how near one term is to another in expressions used in the found documents. The relevance logic 80 can additionally have an artificial intelligence learning component that learns from examples, as trained by a facilitator or another trusted user.

The calculated relevance is then used to map the user's learning objectives and past achievements into the learning objectives offered by the learning application, so that the user can be set tasks by the learning application at an appropriate level, customizing his learning experience.

The user's achievements in the learning application are then mapped back into his profile, using the same calculated relevance to re-convert the achievements and updates in the game's learning objectives to the learning objectives in the user's profile—effectively the weighting previously applied is used in an inverse format.

The mapping logic 80 also enables statistics gathering and math functionalities 86, including keeping records of anonyms data such as high scores, low scores, average scores, median scores, standard deviation of scores, most popular combination of first and second learning objective, least popular combination of first and second learning objective.

An example will now be illustrated. A user profile may contain history for three games which are used for learning applications—a first-person shooting game, a car racing game and an adventure game.

For the first-person shooting game, the recorded achievements could comprise a number of tries, a high score measurement, an item type which in this example describes a type of threat in the game, and a time variable recording the time taken to eliminate the threat. The mapping logic for the first-person shooting game could say that if the number of tries exceeds a certain limit, say one thousand, that a tiredness factor is taken into account, and an achievement is graded on the basis of the time taken, for example a performance can be graded as "good" if the time taken to eliminate the threat is under one second.

For the car racing game, the recorded achievements can comprise an average lap time, the mapping logic can take a tiredness factor into account if the lap count exceeds twenty-five, and an achievement level can be graded according to lap time, for example a performance can be graded as "good" if the average time taken to complete a lap is under one hundred seconds.

For the adventure game, the recorded achievements can include the start time and the time when a virtual character arrived unhurt at a specific point. The mapping logic can compute a speed from the difference in the times, and define a performance level based on a combination of the speed and the level of hurt suffered by the virtual character.

The user's overall achievement in respect of a particular learning objective is then calculated from a sum over all applications, where the weighting of a performance in one learning application is calculated as described above, and all the weighted achievements are summed to give a user an overall score for the particular learning objective.

Continuing the example, a user with the learning profile as described above then accesses a learning application where one of the measured objectives that contributes to a score for a particular learning objective is the speed at which a number of balloons are popped. A good speed is defined as popping ten or more balloons within ten seconds.

An XML script for recording the achievement could look as follows:

```
<training instance>
<date> 20 Nov 2006 </date>
<game> balloon </game>
<learning objective target> speed </ learning objective target>
<support of LO> 75% </support of LO>
<achievement>
<items> 7 </items>
<item type> balloon </item type>
<time> 7.5 </time>
<measurement> average </measurement>
<tries> 5 </tries>
</achievement>
</training instance>
mapping logic:
achievement: (good: 7.5/7 <1; average: 7.5/7 >= 1)
achievement: 75% weighting
```

In this example, the relevance of the learning objective offered by the balloon game to the learning objectives the user has previously completed is calculated as 75%, and so the user's speed achievements in the balloon game are reduced by 75% in order to contribute to his existing user profiles.

The contents of the user profile are in this way effectively marked up according to a semantic taxonomy which enables them to be interpreted by each individual learning application. In this way the user profile data is not described in a rigid data structure with predefined data fields and records which cannot be easily used, for example when a different learning application is used. Individual entries are described in a semantic way giving the profile flexibility to adapt to different learning applications.

This system therefore offers a number of advantages with respect to the prior art. It allows a learner to use a multitude of learning applications with a single user profile capturing the learner's progress and training needs and enables companies to manufacture learning applications that can be used by any learner.

In addition to a profile for an individual it is also possible to have a profile for a team as described above. The users individual profiles can be used to update and modify the strength of a composite team profile.

The system described above may be configured as a computing application, a computing applet, a computing program and/or other instruction set operative on a computing system to perform the functions, operations, and/or procedures described above. An exemplary computing system is controlled in a known way primarily by computer readable instructions, which may be in the form of software, for performing the various steps, processes, and functions described above. The computer readable instructions can contain instructions for the computing system for storing and accessing the computer readable instructions themselves. Such software may be executed within one or more processing units, such as a microprocessor, to cause the computing system to do work.

It should also be noted that the present invention may be implemented in a variety of computer environments (including both non-wireless and wireless computer environments), partial computing environments, and real world environments. The various techniques described herein may be implemented in hardware or software, or a combination of both. Preferably, the techniques are implemented in computing environments maintaining programmable computers that include a processor, a storage medium readable by the processor (including volatile and non-volatile memory and/or storage elements), at least one input device, and at least one output device. Computing hardware logic cooperating with various instructions sets are applied to data to perform the functions described above and to generate output information. Programs used by the exemplary computing hardware may be implemented in various programming languages, including high level procedural or object oriented programming language to communicate with a computer system. Illustratively the herein described apparatus and methods may be implemented in assembly or machine language, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The apparatus may also be considered to be implemented as a computer-readable storage medium, configured with a computer program, where the storage medium so configured causes a computer to operate in a specific and predefined manner.

Various improvements and modifications may be made to the above without departing from the scope of the invention.

The invention claimed is:

1. A computer program product comprising a computer useable medium having program logic stored thereon, the program logic comprising machine readable code executable by a computer, the machine readable code comprising
    a system for interrogating a user profile and reading a learning objective as a first input;
    a system for interrogating a software application and reading a learning objective as a second input;
    a calculation component for determining a relevance of the first input learning objective to the second input learning objective; and
    a system for adapting the software application in accordance with the determined relevance and updating the user profile in accordance with the determined relevance.

2. The computer program product of claim 1, wherein said system for adapting the software application comprises instructions for applying a weighting factor to at least one of existing experience data in the user profile related to the learning objective of the software application and performance data related to the subsequent use of the software application.

3. The computer program product of claim 1, wherein the calculation component comprises a semantic profiling component adapted to determine a quantitative similarity of meaning between the first input learning objective and the second input learning objective for use as the relevance.

4. The computer program product of claim 3, wherein the semantic profiling component comprises a predefined relevance look up table (LUT) for the comparison of one learning objective with the other to obtain the quantitative similarity.

5. The computer program product of claim 3, wherein the semantic profiling component comprises a thesaurus comprising clusters of similar terms.

6. The computer program product of claim 5, wherein the thesaurus is further provided with an indication of the degree of similarity of each cluster or individual term.

7. The computer program product of claim 3, wherein the semantic profiling component comprises a search engine for querying a predefined resource or an on-line search engine and then learning the closeness of the two input terms from the results.

8. The computer program product of claim 1, wherein the learning objectives can be viewed by a facilitator and modified manually.

9. The computer program product of claim 1, the machine readable code further comprising a profile update component for receiving user performance data and an updated learning objective from a software application, and then translating said performance data and said updated learning objective back into a user profile.

10. The computer program product of claim 9, wherein said translation step uses a weighting factor which is the inverse of a weighting factor used for adapting the software application.

11. The computer program product of claim 1, wherein the user profile is a team profile.

12. The computer program product of claim 1, wherein the user profile is part of a composite team profile.

13. The computer program product of claim 2, wherein the weighting factor takes into account a level-of-activity factor calculated on the basis of at least one of: the number of attempts that have been made to perform certain actions in a given software application, the elapsed time and the degree of success or failure.

14. The computer program product of claim 1, the machine readable code further comprising a data gathering component to gather statistical data.

15. The computer program product of claim 14, wherein the statistical data comprises at least one of: high scores, low scores, average scores, median scores, standard deviation of scores, most popular combination of first and second learning objective, least popular combination of first and second learning objective.

16. The computer program product of claim 14 or claim 15, the statistical data is computed for groups of users with similar attributes.

17. The computer program product of claim 16, wherein the groups of users with similar attributes correspond to high or low achieving groups.

18. The computer program product of claim 1, wherein said software application comprises one or more measured objectives formed from a related group of software application measurements; and is adapted for the assessment of a learning objective, said learning objective being formed from:
the selection of one or more measured objectives;
defined outcome conditions for the measured objectives; and
selected outcome activities that each invoke a command in the learning application.

19. The computer program product of claim 1, executed on a server computer that controls the operation of the software application.

20. The computer program product of claim 1, executed on a client or user computer.

21. The computer program product of claim 1 further comprising the user profile.

22. The computer program product of claim 1, wherein the software application is at least one of: a game, a learning application, a games based learning application or a training simulation.

23. A computer implemented method of correlating user profiles to software applications comprising the steps of:
reading a first learning objective from a user profile from a storage medium;
reading a second learning objective from a software application;
determining a relevance of the first learning objective to the second learning objective; and
adapting the software application in accordance with the determined relevance and updating the user profile in accordance with the determined relevance.

24. The computer implemented method of claim 23, wherein said step of adapting the software application comprises applying a weighting factor to at least one of existing experience data in the user profile related to the learning objective of the software application and performance data related to the subsequent use of the software application.

25. The computer implemented method of claim 23, wherein the step of determining a relevance of the first learning objective to the second learning objective comprises determining a quantitative similarity of meaning therebetween.

26. The computer implemented method of claim 25, wherein the step of determining a quantitative similarity of meaning between the first and second learning objectives comprises performing a look-up operation to interrogate a predefined relevance look up table (LUT).

27. The computer implemented method of claim 25, wherein the step of determining a quantitative similarity of meaning between the first and second learning objectives comprises interrogating a thesaurus comprising clusters of similar terms.

28. The computer implemented method of claim 27, wherein the thesaurus is further provided with an indication of the degree of similarity of each cluster or individual term.

29. The computer implemented method of claim 25, wherein the step of determining a quantitative similarity of meaning between the first and second learning objectives comprises an interrogating search engine to query a predefined resource or an on-line search engine and then learning the closeness of the two input terms from the results.

30. The computer implemented method of claim 23, wherein the learning objectives can be viewed by a facilitator and modified manually.

31. The computer implemented method of claim 23, further comprising the step of receiving user performance data and an updated learning objective from a software application, and then translating said performance data and said updated learning objective back into a user profile.

32. The computer implemented method of claim 31, wherein the step of translating said performance data back into a user profile comprises the use of a weighting factor which is the inverse of a weighting factor used for adapting the software application.

33. The computer implemented method of claim 23, wherein the user profile is a team profile.

34. The computer implemented method of claim 23, wherein the user profile is part of a composite team profile.

35. The computer implemented method of claim 24, wherein the weighting factor takes into account a level-of-activity factor calculated on the basis of at least one of: the number of attempts that have been made to perform certain actions in a given software application, the elapsed time and the degree of success or failure.

36. The computer implemented method of claim 23, further comprising the step of gathering statistical data.

37. The computer implemented method of claim 36, wherein the statistical data comprises at least one of: high scores, low scores, average scores, median scores, standard deviation of scores, most popular combination of first and second learning objective, least popular combination of first and second learning objective.

38. The computer implemented method of claim 36, wherein the statistical data is computed for groups of users with similar attributes.

39. The computer implemented method of claim 38, wherein the groups of users with similar attributes correspond to high or low achieving groups.

40. The computer implemented method of claim 23, wherein said software application comprises one or more measured objectives formed from a related group of software application measurements; and is adapted for the assessment of a learning objective, said learning objective being formed from:
 the selection of one or more measured objectives;
 defined outcome conditions for the measured objectives; and
 selected outcome activities that each invoke a command in the learning application.

41. The computer implemented method of claim 23, executed by a server computer that controls the operation of the software application.

42. The computer implemented method of claim 23, executed by a client or user computer.

43. The computer implemented method of claim 23, wherein the software application is at least one of: a game, a learning application, games based learning application, or training simulation.

44. The computer implemented method of claim 23, wherein said step of adapting the software application comprises storing the updated user profile in a storage medium.

45. A system comprising a software application for the assessment of a learning objective, the software application being stored on a computer useable medium, and computer program product according to claim 1.

46. A computer program product comprising a computer useable medium having program logic stored thereon, the program logic comprising machine readable code executable by a computer, the machine readable code comprising instructions for performing the steps according to claim 23.

* * * * *